(12) United States Patent
Winkler (10) Patent No.: US 9,429,930 B2
(45) Date of Patent: Aug. 30, 2016

(54) AUTOMATED ORDER-PICKING STATION FOR THE MANUAL PICKING OF ARTICLES FROM STORAGE CONTAINERS INTO AN ORDER CONTAINER

(71) Applicant: SSI SCHAEFER PEEM GMBH, Graz (AT)

(72) Inventor: Max Winkler, Graz (DE)

(73) Assignee: SSI SCHÄFER PEEM GMBH, Graz (AT)

( * ) Notice: Subject to any disclaimer, the term of this patent is extended or adjusted under 35 U.S.C. 154(b) by 0 days.

(21) Appl. No.: 14/845,730

(22) Filed: Sep. 4, 2015

(65) Prior Publication Data

US 2015/0378345 A1 Dec. 31, 2015

Related U.S. Application Data

(63) Continuation of application No. PCT/EP2014/055252, filed on Mar. 17, 2014.

(30) Foreign Application Priority Data

Mar. 18, 2013 (DE) .......................... 10 2013 005 116

(51) Int. Cl.
*G07F 7/00* (2006.01)
*G05B 19/19* (2006.01)
*B65G 1/137* (2006.01)

(52) U.S. Cl.
CPC .............. *G05B 19/19* (2013.01); *B65G 1/1378* (2013.01); *G05B 2219/32024* (2013.01); *G05B 2219/32037* (2013.01)

(58) Field of Classification Search
CPC .... B65G 1/1378; B65G 1/137; B65G 13/10; B65G 1/026; B65G 1/0478
See application file for complete search history.

(56) References Cited

U.S. PATENT DOCUMENTS

| 2005/0186053 A1 | 8/2005 | Itoh |
| 2009/0136328 A1* | 5/2009 | Schafer .................. B65G 1/026 414/273 |

(Continued)

FOREIGN PATENT DOCUMENTS

| DE | 10 2004 002 831 A1 | 8/2005 |
| DE | 602 01 652 T2 | 10/2005 |

(Continued)

OTHER PUBLICATIONS

International Search Report for corresponding International Patent Application No. PCT/EP2014/055252 dated Jun. 4, 2014.

*Primary Examiner* — Yolanda Cumbess
(74) *Attorney, Agent, or Firm* — Renner, Otto, Boisselle & Sklar, LLP (57) ABSTRACT

An order-picking station for manual picking of articles from storage containers into at least one order container in accordance with a picking order is disclosed, which may consist of a plurality of different articles, comprising: a rack having a first longitudinal side and a second longitudinal side being arranged oppositely to the first longitudinal rack side; a plurality of channels comprising feeding channels and at least one discharging channel, wherein each of the feeding channels comprises a transfer end and a provision end; a supply device configured for transporting the storage containers from a warehouse to the transfer ends of the feeding channels, and for transferring the storage containers to the transfer ends, wherein each of the transfer ends is arranged and configured such that the storage containers are transferable in an automated manner by the supply device; a material-flow control device, wherein the material-flow control device is configured to control a material flow of the storage containers within the channels exclusively unidirectionally, wherein the storage containers in the feeding channels are moved oppositely to the storage containers in the discharging channels; an order-picking region in which a picking person manually picks the articles from the storage container and manually puts the articles into the at least one order container; and a transfer region in which the storage containers are transferred between the supply device and the channels, and vice versa; wherein each of the discharging channels comprises a receipt end and a delivery end, wherein each of the delivery ends is arranged and configured to receive the storage containers by the supply device in an automated manner; wherein the channels are arranged in the rack and extend substantially in parallel to each other, wherein the order-picking region is arranged along the first longitudinal rack side, and wherein the transfer region is arranged along the second longitudinal rack side; wherein each of the feeding channels has assigned at least one of the discharging channels in terms of the material flow; and wherein the provision ends and the delivery ends of the channels, which are assigned to each other, are either spatially arranged directly adjacent, or are connected, to each other via at least one push-away location so that the storage containers can be pushed, or conveyed, without lifting by the picking person, from the provision ends to the receipt end of the respectively assigned at lest one discharging channel.

18 Claims, 4 Drawing Sheets

(56) References Cited

U.S. PATENT DOCUMENTS

| | | |
|---|---|---|
| 2011/0130869 A1 | 6/2011 | Linge et al. |
| 2012/0277903 A1 | 11/2012 | Schaefer |
| 2014/0163721 A1* | 6/2014 | Ogawa ................ B65G 1/0492 700/215 |

FOREIGN PATENT DOCUMENTS

| | | |
|---|---|---|
| DE | 10 2006 023 477 A1 | 11/2007 |
| DE | 10 2006 025 619 A1 | 11/2007 |
| DE | 10 2008 012 877 A1 | 9/2009 |
| DE | 10 2009 050 965 A1 | 5/2011 |
| DE | 10 2010 010 305 A1 | 9/2011 |
| DE | 10 2011 018 983 A1 | 10/2012 |
| EP | 0 847 939 B2 | 6/1998 |
| EP | 1 099 652 A1 | 5/2001 |
| EP | 1 331 179 A1 | 7/2003 |
| EP | 1 710 174 A1 | 10/2006 |
| EP | 1 857 381 A2 | 11/2007 |
| EP | 2 098 464 A1 | 9/2009 |
| EP | 2 327 611 B1 | 6/2011 |
| WO | 2011/107385 A1 | 9/2011 |
| WO | 2012/147261 A1 | 11/2012 |
| WO | WO 2012147261 A1 * | 11/2012 ........... B65G 1/0492 |
| WO | 2013/090969 A1 | 6/2013 |

* cited by examiner

AUTOMATED ORDER-PICKING STATION FOR THE MANUAL PICKING OF ARTICLES FROM STORAGE CONTAINERS INTO AN ORDER CONTAINER

RELATED APPLICATIONS

This is a continuation application of the co-pending International patent application PCT/EP2014/055252 (WO 2014/147007 A1) filed on 17 Mar. 2014 which claims priority of the German patent application DE 10 2013 005 116.9 filed on 18 Mar. 2013. These applications are fully incorporated herein by reference.

BACKGROUND OF THE INVENTION

The present invention relates to an order-picking station and a method for the manual picking of articles from storage containers, which are preferably loaded by one article type only, into at least one order container in accordance with a picking order, which may consist of a plurality of different articles. The invention further relates to an order-picking system having a corresponding order-picking station. The invention is operated in accordance with the "goods-to-man" principle.

RELATED PRIOR ART

The European patent EP 0 847 939 B2 discloses an order-picking station of the claimed type which is arranged within a rack aisle between two racks of an automated small-parts warehouse. There, a picking person removes articles from storage containers, which are delivered in flow channels along a front side of the racks, wherein the flow channels extend in a transversal direction of the racks. There are flow channels for so-called fast movers and flow channels for so-called slow movers. Fast movers are articles which are required frequently, or in great amounts, in picking orders, while slow movers are articles which are required seldom, or in small amounts. The document EP 0 847 939 B2 describes a so-called "piece-picking method", according to which individual piece goods are removed from bigger cases for picking purposes.

Further, the document EP 0 847 939 B2 describes that an order-container roller track runs along the longitudinal side (front side) of the rack at hip height of the picking person. The picking person can be accompanied by the order container (i.e. by pushing) while the picking person walks along an order-picking region (partial region of the front side of the rack). Fast-mover flow channels are permanently filled with a plurality of fast-mover storage containers by means of a storage and retrieval device (hereinafter called "SRD") which can travel along a back side of the rack. As soon as one of the fast-mover storage containers is empty, this container is manually removed by the picking person from the corresponding flow channel because the picking person lifts the container through the air and transfers the container onto the order-container roller track which typically serves for transporting the order containers. Empty fast-mover storage containers thus travel through the entire order-picking region until they reach a junction from where they are brought to a storage-container filling point for being re-stored into the rack. Slow-mover flow channels are characterized in that they are formed as inclined tracks and in that they always hold, in terms of a stock, only one slow-mover storage container. The slow-mover flow channel comprises a locking device so that a completely processed slow-mover storage container can be pushed back by the picking person manually towards the back side of the rack and then can be held there by the locking device. In contrast to the fast-mover flow channels the slow-mover flow channels are thus operated bidirectionally. In the pushed back locking position it is possible that the SRD retrieves the slow-mover storage container and replaces the same by a new (different) slow-mover storage container which is delivered to the SRD from a remote warehouse.

This conventional order-picking station, which is actually integrated into the (warehouse) rack and provided with an additional (order-container) conveying device extending along the longitudinal side of the rack, has a relatively low picking performance. Since the conveying device (roller track) for the order containers runs through the order-picking region, only a few storage containers can be provided. Since the fast-mover flow channels are arranged beneath the roller track of the order containers, the picking person needs to bend over for removing empty fast-mover storage containers and needs to lift the same onto the roller track of the order containers. This is ergonomically unfavorable. In addition, for separating completed order containers and empty storage containers, a monitoring device must be provided which recognizes the mixed container stream and initiates corresponding separation processes. This increases the costs and the control efforts (at least for the material-flow computer).

An order-picking performance of the order-picking station in accordance with the document EP 0 847 939 B2 is small because always only one single slow-mover storage container can be provided for each (bidirectionally operated) flow channel. For exchanging a slow-mover type, the preceding slow mover needs to be pushed back first (manually against gravity) within the corresponding flow channel, and then needs to be retrieved by the storage and retrieval device. Only then the storage and retrieval device can retrieve the new desired slow mover from a warehouse region, transport the same to the order-picking station, and feed the same into the flow channel which became free. Buffering of a plurality of slow movers, which are different in type, within one channel is not possible.

The German patent application DE 10 2010 010 305 A1 describes an enhancement in comparison to the document EP 0 847 939 B2. The document DE 10 2010 010 305 A1 also discloses an automated order-picking station for the manual picking of articles from storage containers into at least one order container. Therein, fast moving articles are provided in flow channels which are operated preferably in a unidirectional manner. Average and slow movers are also provided through a flow channel, which is preferably operated in a unidirectional manner. One or more order containers are provided in delivery channels which are preferably operated bidirectionally. The ends of these channels form a (homogenous) order-picking area which is not passed by a conveying system for transporting the order containers. Thereby it is ensured that the order-picking area is optimally used with regard to a possible number of containers provided. No spaces are given away. Nevertheless, the picking person needs to lift the containers from his/her back for transferring the containers. The picking person also needs to bend over for removing articles, which are required frequently, from the corresponding storage containers since the fast-mover storage containers are all arranged above the order containers, but at least at the same height as the order containers.

The document DE 10 2010 010 305 A1 preferably provides an additional channel for transporting away storage containers, which are completely, or partially, emptied, the additional channel being oriented in parallel to the other channels and an end of which is also arranged within the order-picking area. Since only the order-container delivery channels are typically operated bidirectionally, at any time it would need to be ensured that without the additional channel, which is configured to remove storage containers from the order-picking area, at least one of the order-container delivery channels is free in order to be able to receive and discharge an empty storage container. For allowing simultaneous filling of a maximum number of order containers, it is required, however, to supply each of the order-container delivery channels with order containers.

In the following, for example, containers will be described as load supports for the articles to be picked. A "container" is to be understood as any type of load support which is suitable for conveying articles, which are to be picked, to the order-picking station of the invention. The term "container", for example, also includes trays, cartons, pallets, and similar load supports. However, the articles can also be provided without load supports.

"Fast movers" and "slow movers" are to be understood in the following as articles of category A, as well as of category B or C, of an article assortment, which are classified in accordance with specific criteria, for example, turnover amount handling frequency, or access frequency. Articles of the category A have high turnover quantities, handling rates, or access frequencies, wherein articles of category C have small ones. The boundaries between groups of the categories A, B and C are individually established. The sorting in accordance with appearance frequencies results in a so-called Lorenz curve. It is clear that the slow movers can also be expanded by the average movers ("articles of category B"). For simplifying the illustration, only fast movers and slow movers will be distinguished in the following, if necessary. However, this representation can be expanded by arbitrary intermediate categories.

If the storage-container flow channels are not operated bidirectionally, the storage containers need to be lifted from their respective delivery locations, and need to be moved through the air to the discharging channel.

In general, particular safety regulations need to be obeyed with the above-mentioned known order-picking stations, if the storage containers and/or order containers are provided and retrieved by machines, particularly if a storage and retrieval device is used which is provided with a load-handling device, which in turn enters the rack for exchanging the containers. The safety needs to be guaranteed at any time. This means that no unprotected regions are admissible where the picking person and the storage and retrieval device could collide (unintentionally) with each other. For this reason, for example, the flow channels of the document EP 0 847 939 B2 comprise stopping elements, which can be activated, for holding pushed-back containers at a position remote to the picking person while the storage and retrieval device exchanges this container. The provision and control of this stop (retaining element) is costly.

The document DE 10 2008 012 877 A1 as well as the document EP 2 327 644 A1 respectively relate to an order-picking device and method for order-picking of articles from source containers into target containers, wherein a vertically rotating conveyor is used for feeding and discharging the source containers and the target containers.

The document DE 10 2006 025 619 A1 discloses a rack-integrated packing station where articles are removed from trays and put onto order pallets, wherein the trays are provided by means of elevators being arranged along longitudinal sides of warehouse racks.

The document DE 10 2009 050 965 A1 discloses an order-picking aisle where articles in an aisle are removed from laterally provided pallets, which are fed and discharged at a back side.

The document DE 10 2006 023 477 A1 discloses a warehouse and order-picking system as well as a picking method, wherein a vertically rotating conveyor for feeding and discharging articles is used, which articles are picked at order-picking locations above a warehouse region.

The document DE 602 01 652 T2 discloses an order-picking station which is connected to a main conveying system via a plurality of conveying-branch lines, wherein in the region of the branch lines a vertical order-picking buffer is provided.

SUMMARY OF THE INVENTION

Therefore, it is an object of the present invention to provide an enhanced method and an enhanced order-picking station for the picking of articles from storage containers into order containers, in particular if an exchange of the storage containers happens in an automated manner.

According to a first aspect it is disclosed an order-picking station for the manual picking of articles from storage containers, which are preferably loaded by one article type only, into at least one order container in accordance with a picking order, which may consist of a plurality of different articles, comprising a plurality of channels comprising feeding channels and at least one discharging channel, wherein each of the feeding channels preferably comprises a length suitable for receiving at least two of the storage containers one behind the other, and wherein each of the feeding channels comprises a transfer end and a provision end; a supply device by means of which the storage containers can be transported from a warehouse to the transfer ends of the feeding channels and by means of which the storage containers can be transferred to the transfer ends, wherein each of the transfer ends is arranged and configured such that the storage containers are transferable in an automated manner by the supply device; a material-flow control device, wherein the material-flow control device is configured to control a material flow of the storage containers within the channels exclusively unidirectionally, wherein the storage containers in the feeding channels are moved oppositely to the storage containers in the discharging channels; an order-picking region in which a picking person manually picks the articles from the storage container and manually puts the articles to the at least one order container; and a transfer region in which the storage containers are exchanged between the supply device and the channels, and vice versa; wherein each of the discharging channels comprises a receipt end and a delivery end, wherein each of the delivery ends is arranged and configured such that the storage containers are receivable by the supply device in an automated manner; wherein the channels are arranged in a rack and extend substantially in parallel to each other, wherein the order-picking region is arranged along a first longitudinal rack side and the transfer region is arranged along a second longitudinal rack side being arranged oppositely to the first longitudinal rack side; characterized in that each of the feeding channels has assigned at least one of the discharging channels in terms of the material flow; and the provision ends and the delivery ends of channels, which are assigned to each other, are either spatially arranged directly adjacent, or are connected, to each other via at least one push-away location so that the storage containers can be pushed, or conveyed, without lifting by the picking person, from the provision ends to the receipt end of the respectively assigned at least one discharging channel.

According to a second aspect it is disclosed an order-picking station for manual picking of articles from storage containers into at least one order container in accordance with a picking order, which may consist of a plurality of different articles, comprising: a rack having a first longitudinal side and a second longitudinal side being arranged oppositely to the first longitudinal rack side; a plurality of channels comprising feeding channels and at least one discharging channel, wherein each of the feeding channels comprises a transfer end and a provision end; a supply device configured for transporting the storage containers from a warehouse to the transfer ends of the feeding channels, and for transferring the storage containers to the transfer ends, wherein each of the transfer ends is arranged and configured such that the storage containers are transferable in an automated manner by the supply device; a material-flow control device, wherein the material-flow control device is configured to control a material flow of the storage containers within the channels exclusively unidirectionally, wherein the storage containers in the feeding channels are moved oppositely to the storage containers in the discharging channels; an order-picking region in which a picking person manually picks the articles from the storage container and manually puts the articles into the at least one order container; and a transfer region in which the storage containers are transferred between the supply device and the channels, and vice versa; wherein each of the discharging channels comprises a receipt end and a delivery end, wherein each of the delivery ends is arranged and configured to receive the storage containers by the supply device in an automated manner; wherein the channels are arranged in the rack and extend substantially in parallel to each other, wherein the order-picking region is arranged along the first longitudinal rack side, and wherein the transfer region is arranged along the second longitudinal rack side; wherein each of the feeding channels has assigned at least one of the discharging channels in terms of the material flow; and wherein the provision ends and the delivery ends of the channels, which are assigned to each other, are either spatially arranged directly adjacent, or are connected, to each other via at least one push-away location so that the storage containers can be pushed, or conveyed, without lifting by the picking person, from the provision ends to the receipt end of the respectively assigned at least one discharging channel.

The order-picking station of the invention is completely operable in an automated manner with regard to material flow. Pushing back processed storage containers in a channel opposite to the feeding direction is excluded. Thus, risk of injury of the picking person is excluded because the picking person cannot collide with the (automated) supply device. The picking person does not need to lift completely processed storage containers and move them through the air for disposing them. The picking person pushes the processed storage containers to the assigned discharging channel, or causes an automated transport of the processed storage containers from the feeding channel to the assigned discharging channel. In the last case the push-away locations are provided with driven conveyors.

The order-picking station of the present invention allows buffering of a plurality of different slow-mover storage containers. Within one feeding channel a plurality of slow-mover storage containers can be buffered one behind the other in a preset sequence because the completely processed storage containers are not pushed back into their feeding channels but are moved towards the assigned discharging channel. Thus, no forward and rearward movements occur within one of the channels at the same time. The storage containers travel within the order-picking region along an open loop-like path which is closed by the supply device.

The supply device is relieved because different (slow-mover) storage containers can be buffered within one and the same channel. Hence, the supply device does not to wait until the storage container, which is located in one of the feeding channels, is processed but can deliver the next storage container of the sequence arbitrarily as soon as time allows. Of course, the same is true with regard to the transporting completely processed storage containers away. The completely processed storage containers do not need to be discharged immediately but can be accumulated within one of the discharging channels until the supply device has the time to retrieve the completely processed storage containers. Thus, in particular, the supply device is relieved. Nevertheless, more storage containers per spatial unit can be delivered. Thus, the efficiency and performance of the order picking process is increased.

The order-picking station of the present invention is very ergonomic.

Control effort associated with the material flow at the order-picking station of the present invention is smaller as with prior art. The material-flow computer can neglect forward and rearward movements within one and the same channel. The containers flow within one of the channels in a unidirectional manner. It is even possible to dispose order containers and storage containers via the same discharging channel. Of course, the same is true for the feeding of storage containers and order containers.

The assignment of one of the channels with regard to material flow can be changed arbitrarily often. In a first moment the storage containers are delivered and disposed. In another moment the order containers can be delivered and disposed via the same channels which are assigned to each other. A designer is completely free in the occupation of the channels.

The channels preferably extend in the transversal direction of the system. Due to a corresponding arrangement it is possible to use conventional elements such as storage and retrieval devices, flow channels, and the like.

Further, it is advantageous if the supply device is a conveying system, a shuttle, or a storage and retrieval device.

The present invention allows using any type of transportation device for the purpose of feeding and discharging the containers.

With a preferred embodiment, respectively one of the push-away locations is located oppositely to one of the provision ends, or of the receipt ends.

In this case, the push-away locations represent additional elements besides the channels and can be used for delivering the storage containers, or the order containers. However, they are substantially used as transportation lines for discharging the completely processed containers. Thus, for example, it is possible to bridge height differences between one of the feeding channels and the discharging channel being assigned to this feeding channel without requiring the picking person to lift, or move, the container through the air.

With another advantageous embodiment the push-away locations define a push-away line.

In this case, a material flow computer can take into account the push-away locations in terms of a conveying line. The push-away line can be driven, or non-driven. The driven version is ergonomically better because the picking person does not need to push the containers. In this case, the containers are transported in an automated manner to the discharging channel.

Additionally, it is advantageous to provide respectively one stopping device at the provision ends.

The stopping device prevents the stocked storage containers from following in an uncontrolled manner as soon as one of the storage containers is completely processed and pushed away.

In particular, the push-away locations are driven, or non-driven flow channels.

With other advantageous embodiments the feeding channels are driven, or non-driven, flow channels.

The replenishment of containers can be conducted in this way in an automated manner, namely for both the feeding and the discharging.

Further, it is advantageous if also the discharging channels are driven, or non-driven, flow channels.

The same advantages as above apply.

With another particular embodiment the order-picking station further comprises an order-container conveying system running through the order-picking region and being preferably formed by accumulation-conveyor elements.

In particular, the material-flow control device is configured to transport the order containers in some of the channels, which are assigned to each other, towards the picking person and away from the picking person.

For the design of the system it is secondary whether one of the channels is operated with the order containers or the storage containers. The container type being buffered in the channel is within the discretion of the designer of the system. The designer of the system is free with regard to the configuration of channel assignments.

According to third aspect it is disclosed an order-picking system comprising an order-picking station for manual picking of articles from storage containers into at least one order container in accordance with a picking order, which may consist of a plurality of different articles, the order-picking station comprising: a rack having a first longitudinal side and a second longitudinal side being arranged oppositely to the first longitudinal rack side; a plurality of channels comprising feeding channels and at least one discharging channel, wherein each of the feeding channels comprises a transfer end and a provision end; a supply device configured for transporting the storage containers from a warehouse to the transfer ends of the feeding channels and for transferring the storage containers to the transfer ends, wherein each of the transfer ends is arranged and configured such that the storage containers are transferable in an automated manner by the supply device; a material-flow control device, wherein the material-flow control device is configured to control a material flow of the storage containers within the channels exclusively unidirectionally, wherein the storage containers in the feeding channels are moved oppositely to the storage containers in the discharging channels; an order-picking region in which a picking person manually picks the articles from the storage container and manually puts the articles into the at least one order container; and a transfer region in which the storage containers are transferred between the supply device and the channels, and vice versa; wherein each of the discharging channels comprises a receipt end and a delivery end, wherein each of the delivery ends is arranged and configured to receive the storage containers by the supply device in an automated manner; wherein the channels are arranged in the rack and extend substantially in parallel to each other, wherein the order-picking region is arranged along the first longitudinal rack side, and wherein the transfer region is arranged along the second longitudinal rack side; wherein each of the feeding channels has assigned at least one of the discharging channels in terms of the material flow; and wherein the provision ends and the delivery ends of the channels, which are assigned to each other, are either spatially arranged directly adjacent, or are connected, to each other via at least one push-away location so that the storage containers can be pushed, or conveyed, without lifting by the picking person, from the provision ends to the receipt end of the respectively assigned at least one discharging channel.

In particular, the order-picking system comprises a storage-container warehouse coupled to the channels via the supply device.

According to a fourth aspect it is disclosed a method for the manual picking of articles from order containers, which are loaded preferably by one article type only, in accordance with picking order into an order container at an order-picking station of the invention, comprising the steps of feeding the storage containers in a preset sequence to one of the feeding channels; removing the article(s) from the fed storage container; delivering the removed article(s) to the order container; pushing or transporting the storage container, from which the article(s) have been removed, from the feeding channel to the discharging channel; discharging the storage container, from which the article(s) have been removed, via the assigned discharging channel; wherein the feeding channel and the assigned discharging channel are operated oppositely in unidirectional manners.

According to a fifth aspect it is disclosed A method for the manual picking of at least one article from order containers in accordance with a picking order into an order container at an order-picking station which includes a plurality of channels comprising feeding channels and at least one discharging channel, wherein each of the feeding channels has assigned at least one of the discharging channels in terms of the material flow, the method comprising the steps of: feeding the storage containers in a preset sequence to one of the feeding channels; removing the at least one article from the fed storage container; delivering the removed at least one article to the order container; pushing, or transporting, the storage container, from which the at least one article has been removed, from the feeding channel to the discharging channel; discharging the storage container, from which the at least one article has been removed, via the assigned discharging channel; wherein the feeding channel and the assigned discharging channel are operated oppositely in a respectively unidirectional manner.

It is clear that the above-mentioned and hereinafter still to be explained features cannot only be used in the respectively given combination but also in other combinations or separately without departing from the scope of the present invention.

BRIEF DESCRIPTION OF THE DRAWINGS

Embodiments of the invention are illustrated in the drawings and will be explained hereinafter in more detail.

PREFERRED EMBODIMENTS OF THE INVENTION

The order-picking station of the present invention, which is mentioned in the description of the following figures, is also suitable, amongst other things, for batch picking. Typically, a "batch" is to be understood as a collection of several orders forming a sequenced quantity or list of orders. One order consists of one or more order positions (also called "order lines") including the respective quantity of articles. During batch picking a plurality of orders are processed in parallel, for example, by removing articles from storage containers, which include one article type only, and distributing them onto different order containers requiring this article type in accordance with their respective picking order. In this case the removing process happens in an article-oriented manner. The batch picking process is, however, of secondary order for the present invention. There is no need to pick batchwise at the order-picking station of the present invention.

Figure 1:
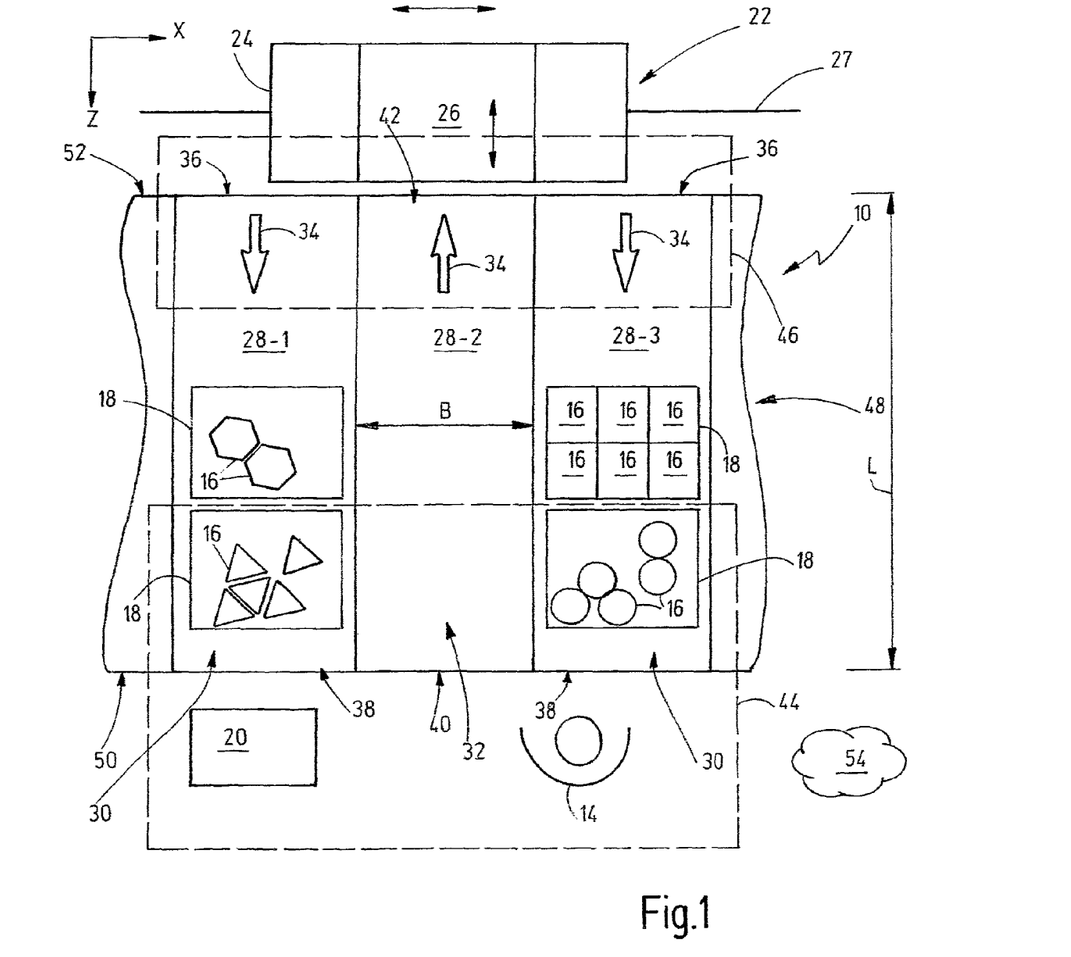
FIG. 1 shows a top view of an order-picking station in accordance with the invention.

FIG. 1 shows a top view of a partially illustrated order-picking system 10, in particular of an order-picking station 12 where a picking person 14 manually removes articles 16 in accordance with a picking order from one or more storage containers 18, and delivers same to an order container 20 being assigned to this picking order. The picking person 14 can comprise a picking person guidance system, which is not shown in further detail here, indicating to the picking person 14 which of the articles and how many of the articles are to be removed from which of the storage containers 18 and into which of the order containers 20 the removed articles are to be delivered. The picking process can be performed, for example, by means of pick-by-light, pick-by-voice, pick-by-vision or any similar guidance concept. The articles 16 can be articles of categories A, B, or C. The containers 18 are loaded preferably by one article type only, or by one article type only in a compartment-divided manner.

The order-picking station 12 is an element of the order-picking system 10. The order-picking system 10 further comprises a supply device 22 for exchanging the storage containers 18 between the order-picking station 12 and a warehouse region (e.g., rack warehouse) which is not shown in further detail here. The supply device 22 is implemented exemplarily in FIG. 1 by a storage and retrieval device 24 having a load-handling device 26. The storage and retrieval device 24 can travel (horizontally) along a rail 27 extending in a longitudinal direction X of the system 10. The load-handling device 26 is arranged on a lifting platform, which is not shown in further detail here, wherein the lifting platform can travel vertically between masts of the storage and retrieval device 24, which are not shown in detail neither, along a height direction Y perpendicular to the drawing plane. The load-handling device 26 is configured to move the storage containers 18 in a transversal direction Z of the system 10, and to exchange them with channels 28 of the order-picking station 12. For example, the load-handling device 26 can be implemented by telescopic forks, which can be extracted and retracted in the transversal direction Z, in order to travel below the storage containers 18 in the channels 28 and to lift them. The load-handling device 26 can also be implemented by grabbing arms retractable and extractable in the transversal direction Z, which grabbing arms are movable in the longitudinal direction X for laterally grabbing around the storage containers 18. The expert knows a plurality of different load-handling devices which are also suitable for exchanging the storage containers 18 in the channel 28.

The supply device 22 can further be implemented by a conventional conveying system (steady conveyor such as driven roller tracks including transversal displacement devices; chain conveyors; shuttles, one-plane service devices; multi-plane service devices, overhead conveyors, or the like).

In the present case the channels 28 of the order-picking station 12 exemplarily extend substantially in the transversal direction Z. In FIG. 1 three channels 28-1 to 28-3 are shown in more detail. The channels 28-1 to 28-3 preferably are arranged in parallel to each other and comprise, preferably an identical, length L and width B. The length L and the width B can vary from channel 28 to channel 28. The length L and the width B depend on the dimension of the (storage) containers 18 which are to be handled in this channel.

The channels 28-1 and 28-3 of the three channels 28-1 to 28-3 shown in FIG. 1 represent feeding channels 30. Channel 28-2 represents a discharging channel. The containers 18 are delivered via the feeding channels 30. The containers 18 are disposed via the discharging channels 32. In general, the storage containers 18 are transported exclusively in the feeding channels 30 from the supply device 22 towards the picking person 14 (cf. light arrows 34). The storage containers 18 are transported exclusively in the discharging channels 32 towards the supply device 22 (cf. light arrow 34) after articles 16 have been removed therefrom. The channels 28 are operated preferably in a unidirectional manner. Within the unidirectionally operated channels 28, the containers 18 move in one single direction within the channels 28 only. In bidirectionally operated channels (not shown in FIG. 1) the containers 18 can move back and forth within the respective channel.

Each of the feeding channels 30 comprises a transfer end 36 arranged oppositely to the supply device 22. Each of the feeding channels 30 comprises a provision end 38 which faces the picking person 14. Each of the discharging channels 32 comprises a receipt end 40 which in turn faces the picking person 14. Each of the discharging channels 34 comprises a delivery end 42 arranged directly adjacent to the supply device 22. The provision ends 38 of the feeding channels 30 and the receipt ends 40 of the discharging channels 32 are arranged within an order-picking region 44 indicated by a dashed line in FIG. 1. The transfer ends 36 of the feeding channels 30 and the delivery ends 42 of the discharging channels 32 are located in a transfer region 46 which is again indicated by a dashed line in FIG. 1.

The order-picking region 44 represents a space in which the picking person 14 moves for removing the articles 16 from the delivered storage containers 18 and to put them into provided order containers 20. The order-picking region 44 can also comprise the provision ends 38 of the feeding channels 30. The order-picking region 44 can also comprise the receipt ends 40 of the discharging channels 32. It is clear that the arrangement of the channels 28, which is illustrated in FIG. 1 in only one plane, can be continued in the height direction Y for delivering the storage containers 18 at several planes being arranged on top of each other and/or beneath each other. For this purpose, the channels 28 are preferably arranged within a rack 48 which is not shown in further detail. The rack 48 can comprise vertical rack posts and horizontal reinforcement struts for receiving the channels 28. The rack 48 comprises a front side 50 and a back side 52.

Figure 2A:
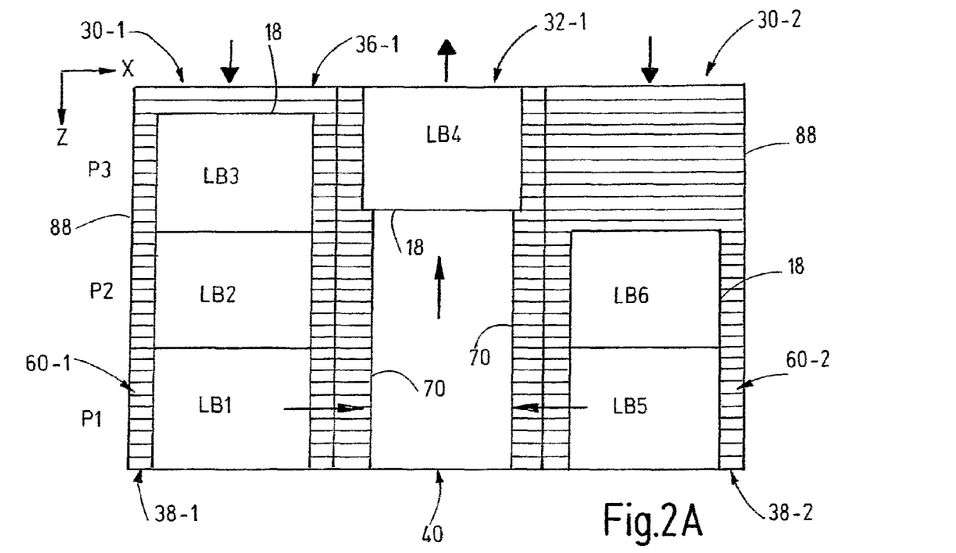
FIG. 2A shows a first possibility of a channel arrangement.
Figure 2B:
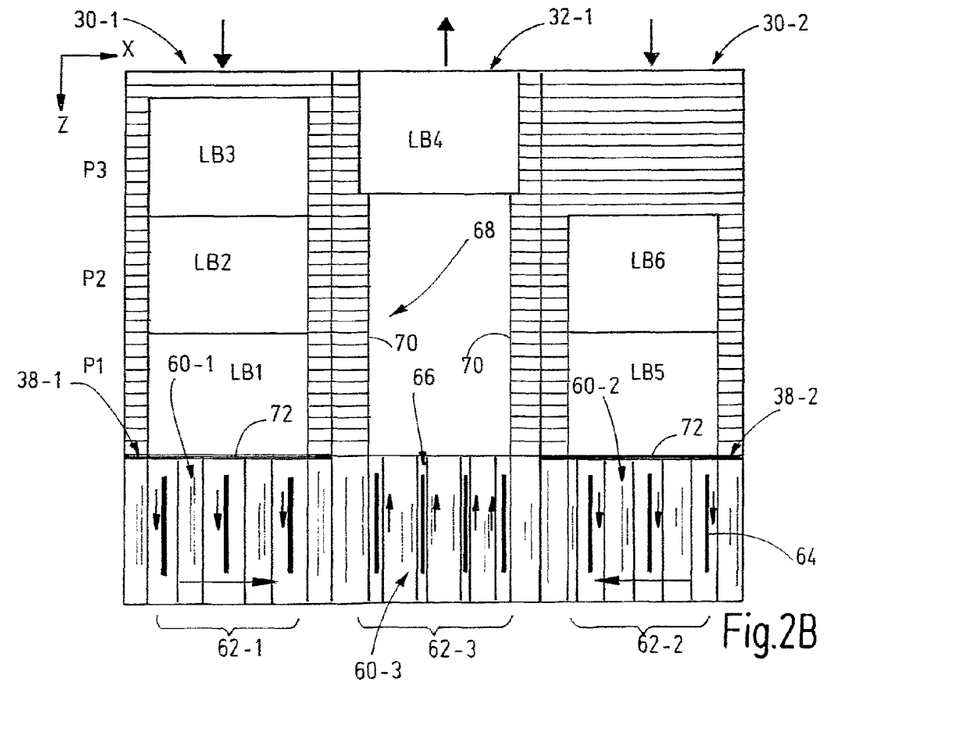
FIG. 2B shows a second possibility of a channel arrangement.

Within the order-picking region 44 the provision ends 38 of the feeding channels 30 are coupled to the receipt ends 40 of the discharging channels 32. Each of the receipt ends 40 can be arranged, e.g. in the longitudinal direction X, directly adjacent to at least one of the provision ends 38. The arrangement of the provision ends 38 and the receipt ends 40 is such that the picking person 14 can, for example, push processed storage containers 18, e.g. in the longitudinal direction X, from the provision ends 38 where the storage containers 18 are delivered for the article removal to at least one of the receipt ends 40. Transferring the processed storage containers 18 by lifting and moving them through the air is not required and not desired. Each of the feeding channels 30 has assigned at least one of the discharging channels 32 for transporting the processed storage containers 18 out of the order-picking region 44. The assignment is such that the channels 28, which are assigned to each other, are spatially connected so that the processed storage containers 18 can be moved from the feeding channels 30 by means of a translatory motion (which might be driven or not) without lifting them by the picking person 14 to the respectively assigned discharging channel 32. With reference to FIG. 2, different possibilities will be shown below for indicating how channels 28, which are assigned to each other, can be spatially connected for connecting (directly) to each other the provision ends 38 and receipt ends 40, which are assigned to each other.

The transfer region 46 defines a space where an exchange of the storage containers between the supply device 22 and the channels 28 occurs. The transfer region 46 also comprises the space where the transfer ends 36 of the feeding channels 30 and the delivery ends 42 of the discharging channels 22 are arranged. In the top view of FIG. 1, the transfer ends 36 of the feeding channels 30 and the delivery ends 42 of the discharging channels 32 are arranged directly adjacent. It is clear that the transfer ends 36 and the delivery ends 42, however, cannot be arranged directly adjacent because there is no, or there must not be, a direct material flow transfer between the transfer ends 36 and the delivery ends 42. The transfer ends 36 and the delivery ends 42 of the channels 28, which are assigned to each other, can be located, for example, a different heights. This is particularly true if the channels 28 are implemented by (inclined) flow channels. As a rule, flow channels are not motor-driven. Transport of the storage containers 18 within the flow channels happens, as a rule, only due to gravity. In this context one also speaks of inclination tracks, or inclined gravity tracks. These tracks can be provided with idling rollers for ensuring safe feeding of the storage containers 18 to the respective provision ends 38, which can serve as delivery locations, and to the delivery ends 42.

This type of arrangement will be explained in more detail with reference to FIG. 3.

If the channels 28 are arranged in the rack 48, then the provision ends 38 and the receipt ends 40 are located preferably within the region of the front side 50 of the rack 48. The front side 50 preferably corresponds to a first longitudinal side of the rack 48 which is then longer in the direction X than it is deep in the transversal direction Z. The transfer ends 36 and the delivery ends 42 are arranged along the back side 52 of the rack 48. The back side 52 corresponds to a second longitudinal side of the rack 48 which is preferably arranged in parallel to the front side 50 and which is arranged oppositely thereto. Preferably, each of the transfer ends 36 and the delivery ends 42 are located within the back side 52 extending parallel to the plane XY in FIG. 1. It is clear that the transfer ends 36 and the delivery ends 42 of different provision planes can be displaced slightly to each other in the transversal direction Z, in order to facilitate access to the articles 16 being supplied at different heights Y. It is preferred to displace higher planes further backwards in the transversal direction Z in order to enhance the view of the picking person 14 into the corresponding storage container 18.

Further, in FIG. 1 a control device 54 is shown which in particular controls a material flow in the system 10 and supply of the order-picking station 12 with the containers 18 and 20. The material flow includes the feeding of the storage containers 18, from which the articles 16 are removed, disposal of the storage containers 18 from which the articles 16 have already been removed, as well as optionally the feeding and discharging of the order containers 20.

FIG. 2A shows a top view of three channels 28 of an order-picking station 12 which is not shown in further detail. The three channels 28 form a first variation of a (channel) module. With reference to FIG. 2B, a second variation of a module will be described based on the first module of FIG. 2A being expanded by several elements.

Similar to the module of FIG. 1 the module of FIG. 2A comprises two feedings channels 30-1 and 30-2 between which a discharging channel 32-1 is arranged.

The feeding channels 30-1 and 30-2 are respectively assigned to the discharging channel 32-1. The first feeding channels 30-1 comprises at its provision end 38 a push-away location 60-1 which simultaneously serves as delivery location for one storage container LB1. A delivery location is a region where one or more of the storage containers 18 can be placed for allowing (manual) removal of the articles 16. In FIG. 2A the channels 28 are so long that they can receive and buffer at least three of the storage containers 18 one behind the other. The feeding channel 30-1 buffers three of the storage containers 18 (LB1-LB3). The storage container LB1 is located on the push-away location 60-1 which also serves as the delivery location. The storage container LB2 is located on a second position P2 and serves as supply in case the storage container LB1 is completely picked and has been pushed away towards the discharging channel 32-1. The storage container LB3 is located in the channel 30-1 at a third position P3, i.e. totally at the "back". The storage container LB3 is located at the transfer end 36-1 and serves as a second buffer-storage container 18 behind the first buffer-storage container LB2. The second feeding channel 30-2 stores both of the storage containers LB5 and LB6. The storage container LB5 is located on the push-away location 60-2, which simultaneously serves as a delivery location. The storage container LB6 is located on the second position P2 of the channel 30-2 and once again serves as supply. The storage container LB4 is located in the discharging channel 32-1 at the supply end 42 of this channel 28 and is ready for being retrieved by the (not shown) supply device 22 (cf. FIG. 1).

The feeding channels 30-1 and 30-2 in FIG. 2A are exemplarily realized by roller tracks 88. The roller tracks 88 can be formed by idling rollers for forming the above-mentioned gravity tracks. The discharging channel 32-1, for example, is formed by laterally arranged strips 70 of small rollers for allowing the load-handling device 36 of the supply device 22 to travel into the discharging channel 32-1 in the transversal direction Z and to (vertically and horizontally) lift the storage container LB4 in a centered manner.

Figure 4:
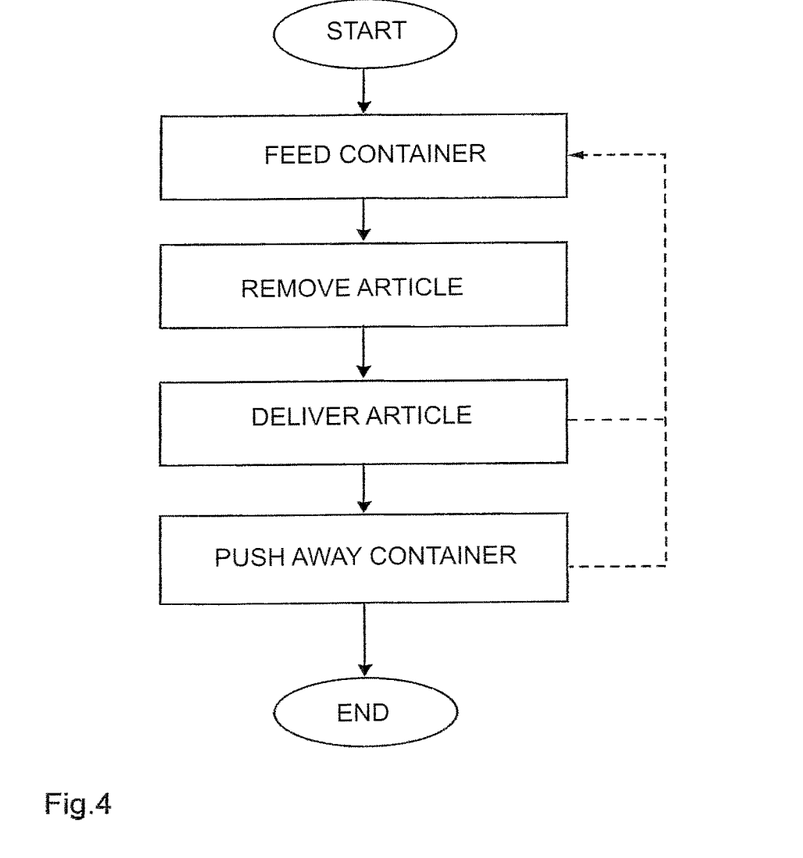
FIG. 4 shows a flow chart of an order-picking method.

In FIG. 2A a state of the module is shown after the articles 16 have been removed from the storage container LB4, and the storage container LB4 has been pushed away from the supply location 60-2 of the second feeding channel 32-2 in the longitudinal direction X to the left into the discharging channel 32-1. Preferably, the pushing away is conducted manually since the picking person 14 (not shown) pushes the storage container 18 from the feeding channel 30 into the discharging channel 32 assigned thereto. It is clear that the storage container LB1, after the required articles 16 have been removed therefrom, can also be moved longitudinally into the discharging channel 32-1. The remaining buffered storage containers LB2 and LB3 then follow (preferably automatically, for example, due to gravity) so that the storage container LB2 is then located on the push-away location 60-1. The storage container LB3 is then located on the second position P2. Then, there is space at the third position P3 for a new storage container LB18 which can be delivered via the supply device 22 (see also FIG. 4).

The longer the channels 28 are, the more storage containers 18 can be buffered. This is true for both the feeding channels 30 and the discharging channels 32. The buffering can happen in a preset sequence. Within one of the channels 30 different articles 16 can be buffered in a sequenced manner.

Preferably, the channels 28 have a length (capacity) of at least two storage containers 18 so that the "front" storage container 18 serves for removal, and at least one additional position exists behind this one which can be filled with another storage container 18 by the supply device 22. In this case no safety-relevant objections exist because the following storage container 18 (for example LB2 or LB3) is outside the grabbing region of the picking person 14 so that a collision between the picking person 14 and the supply device 22 is not possible. There is no danger of injuries. Of course, the receiving capacity of the feeding channels can be selected such that only one single storage container can be received. A minimum length of the feeding channels thus corresponds to the length of one single storage container 18, preferably of the longest storage container 18 if containers are used which do not have uniform dimensions.

Additionally, it is clear that the containers can be both fast-mover storage containers 18 and slow-mover storage containers 18, also mixed. Since the slow-movers storage containers 18 are not pushed back in the same channel opposite to the feeding direction, in order to be retrieved by the supply device 22, it is possible to buffer sequences of different slow-mover article types in the feeding channels 30. Due to the buffer capacity of the channels 28 the supply device 22 is relieved. The supply device 22 does not need to retrieve a completed storage container 18 immediately for storing the same back into the assigned warehouse. The supply device 22 does not need to supply a new storage container 18 immediately, if one of the storage containers 18 has been processed, because supply of new storage containers 18 is already present.

FIG. 2B shows a second variation of a module of the channels 28 which is structured similar to the module of FIG. 2A. The module of FIG. 2B distinguishes from the module of FIG. 2A only by the location and the structure of the push-away locations 60.

In FIG. 2B three push-away locations 60-1 to 60-3 are shown, wherein the push-away location 60-1 is assigned to the feeding channel 30-1, the push-away location 60-2 is assigned to the feeding channel 30-2, and the push-away location 60-3 is assigned to the discharging channel 32-1. The push-away locations 60-1 to 60-3 are additionally arranged "in front of" the channel 28. The push-away location 60-1 is arranged opposite to the provision end 38-1 of the first feeding channel 30-1. The push-away location 60-2 is located opposite to the provision end 38-2 of the second feeding channel 30-2. The third push-away location 60-3 is arranged directly opposite to the receipt end 40 of the discharging channel 32-1.

Between the feeding channel 30-1 and the first push-away location 60-1 a vertically liftable and lowerable stopping device 72 (e.g. a bar) can be provided in the region of the provision end 38-1, wherein the stopping device 72 prevents the storage containers LB1 to LB3 from moving automatically to the push-away location 60-1. The feeding channel 32-2 can also be provided with a stopping device 72 at the provision end 38-2 thereof for controlling an influx of storage containers 18 to the push-away location 60-2.

The push-away locations 60-1 to 60-3 are exemplarily implemented by roller tracks. Between individual rollers of the push-away location 60 one or more belts 64 can be provided, which can be arranged between the rollers of a respective one of the push-away locations 60 in a liftable and lowerable manner. The belts 64 can convey the storage containers 18 in the transversal direction Z in FIG. 2B.

The rollers of the push-away locations 60 can be idling or can be driven. In FIG. 2B the rollers are exemplarily supported in an idling manner. The belts 64 are driven in an endless rotating manner. In FIG. 2B respectively three of the belts 64 form a belt-lifting group 62. The belt-lifting groups 62-1 and 62-2, which are arranged oppositely to the feeding channels 30-1 and 30-2, are operated such that withdrawal of the storage containers 18 from the feeding channels 30-1 and 30-2 is supported when the stopping devices 72 are lowered.

In this manner it is possible to withdraw the respectively first storage container 18 (e.g. LB1 or LB5) in a faster manner from the respective feeding channel 30-1 or 30-2 while the remaining storage containers 18 (LB2 and LB3, or LB6) are following slower, for example, due to the utilization of a gravity track. As soon as the first storage container 18 (LB1 or LB5) has left the respective feeding channel 30-1, or 30-2, in the longitudinal direction Z the stopping device 72 is vertically lifted in order to form a stop for the following storage containers 18 (LB2 or LB6).

The articles 16, which are to be picked, can either be already removed if the corresponding storage container 18 is still located on the first position P1 of the respective feeding channel 30-1 or 30-2, and/or if the respective storage container 18 is located on the assigned push-away location 60-1, or 60-2.

If the removal of the articles 16 has already been conducted in the respective feeding channel 30, it is preferred to drive the rollers of the respective withdrawal locations 60 (in the direction X). In this case withdrawal of a storage container 18, from which the articles 16 have already been removed, can be conducted in a completely automated manner. The withdrawn storage container 18 can be conveyed, for example, from the first push-away location 60-1 to the right onto the third push-away location 60-3. As soon as the completely picked storage container 18 is located on the third push-away location 60-3 the associated belt-lifting group 62-3 is lifted and driven for transferring the container in an automated manner to the receipt end 40 of the discharging channel 32-1. If the manual removal of the article 16 from the storage containers 18 is also monitored, for example, by means of a correspondingly arranged light grid, the exchange of containers can be performed in a completely automated manner. A corresponding automation is described in the German patent application DE 10 2004 002 831 A1 which is incorporated by reference.

It is clear that not only the storage containers 18 but also the order containers 20 can be moved through the channels 28, wherein the order containers 20, as a rule, remain longer at the delivery locations, namely until each of the articles 18 of one picking order is collected, before the order containers 20 are transported away from the order-picking station 12 via the corresponding assigned withdrawal channel 32. In this case the order-picking station 12, in particular the order-picking region 44, comprises a plurality of the modules which have been described above and which will be described exemplarily below.

Figure 3A:
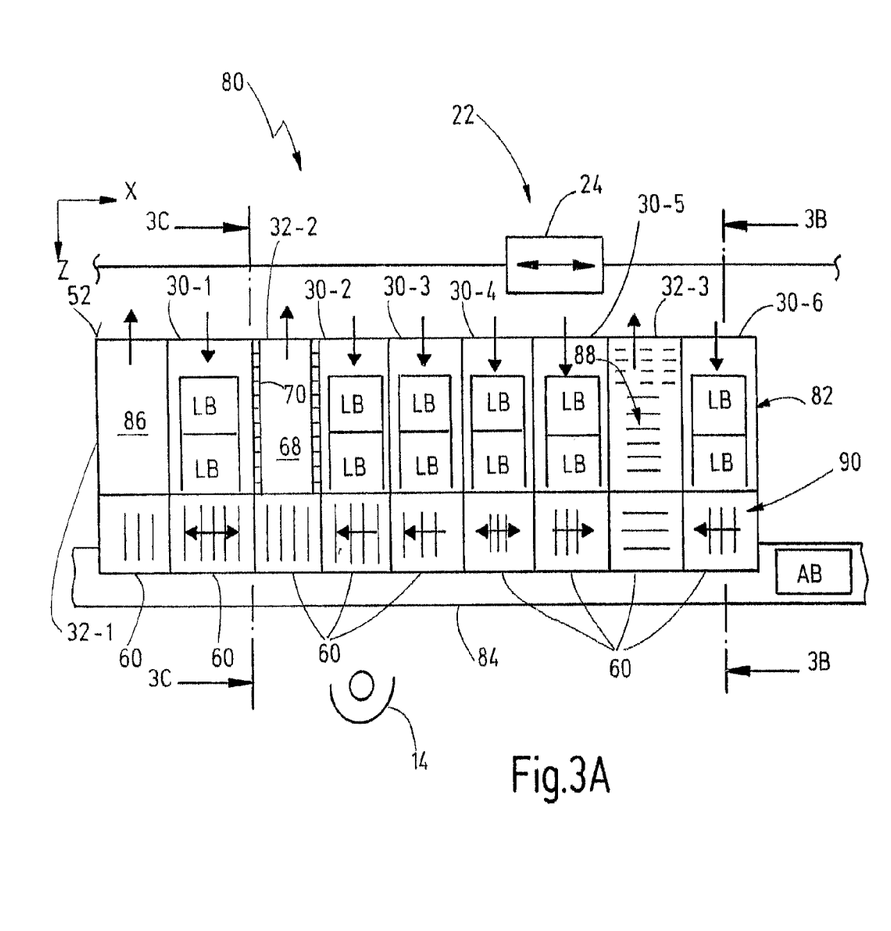
FIG. 3A shows a top view of an alternative order-picking station.

FIG. 3A shows a top view of a third variation of a module consisting of a plurality of feeding channels 30 and discharging channels 32. The number of feeding channels 30 and discharging channels 32 can vary, in general arbitrarily, for each of the modules. Additionally, the top view of FIG. 3A shows an optional order-container conveying system 84 which substantially extends in the longitudinal direction X, at least within the order-picking region 44. As can be derived from the sectional views of FIGS. 3B and 3C along the lines 3B-3B and 3C-3C in FIG. 3A, the order-container conveying system 84 is arranged beneath the delivery locations 60 at a level of height H0. The delivery locations 60 are substantially arranged at the level of height H1, and altogether can define one or more push-away lines 90. In FIG. 3A a push-away line 90 is shown which extends in parallel to and above the order-container conveying system 84. The (additional) push-away locations 60 are arranged oppositely to the provision ends 38 and the receipt ends 40 of the feeding channels 30 and the discharging channels 32 (cf. FIG. 2B).

In FIG. 3A the following channels 28 are shown from the left to the right: discharging channel 32-1, feeding channel 30-1, discharging channel 32-2, feeding channel 30-2, feeding channel 30-3, feeding channel 30-4, feeding channel 30-5, withdrawal channel 32-3, and feeding channel 30-6. The transportation direction of the storage containers 18 in the respective channels 16 is indicated by means of dark arrows. Each of the feeding channels 30-1 to 30-6 has assigned at least one of the discharging channels 32-1 to 32-3, wherein each of the feeding channels 30 has assigned at least one of the discharging channels 32. The following assignments (sub modules) are exemplarily possible:

30-1 with 32-1 and/or 32-2
32-2 with 30-2, 30-3, and 30-4
32-3 with 30-4, 30-5, and 30-6

In general one of the feeding channels 30 can also have assigned a plurality of the discharging channels 32, which is exemplarily the case for the feeding channel 30-4 of FIG. 3A. Each of the discharging channels 32 can have assigned, in general, one or more of the feeding channels 30. For example, the discharging channel 32-2 has assigned four of the feeding channels 30 (30-1, 30-2, 30-3, and 30-4). The discharging channel 32-3 has assigned three of the feeding channels 30 (30-4, 30-5, and 30-6).

The feeding and discharging channels 30 and 32 can be structurally formed differently. The channels 28 can also be formed by roller tracks 88, belt conveyors 86, conveyors 68 of small-roller strips, or the like. The channels 28 can be inclined downwardly or can be arranged horizontally.

Figure 3B:
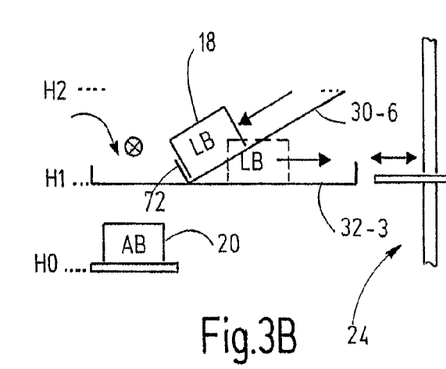
FIG. 3B shows a sectional view along a line 3B-3B in FIG. 3A.

FIG. 3B shows a sectional side view along the line 3B-3B through the order-picking system 80 of FIG. 3A. The section extends through the feeding channel 30-6 which is formed by an inclined gravity track. The discharging channel 32-3, which is arranged in the back thereof, is formed by a horizontal roller conveyor 88 having driven rollers for transporting back the storage containers 18, from which the articles 16 have already been removed for the purpose of picking, towards the storage and retrieval device 24. A downstream end of the feeding channel 30-6 is followed by a push-away location 60 of the push-away track 90. The storage container 18, which is shown by a solid line in FIG. 3B, is held by a stopping device 72 in the feeding channel 30-6, preferably for the purpose of article removal. As soon as the article 16 is removed, the storage container 18 is transferred—by lowering the stopping device 72—onto the associated push-away location 60 from where it can be moved, in the FIG. 3A to the left, to the push-away location 60 which is arranged immediately opposite to the discharging channel 32-2. In FIG. 3A the push-away locations 60 are implemented, for example, by roller tracks 88 (driven or not driven). It is clear that the picking person 14 does not need to lift one of the storage containers 18 and move them through the air for delivering the same to the discharging channel 32. The transport of the containers 18 and 20 happens substantially in an automated manner, particularly if the push-away line 90 consists of driven roller arrays (segments). Otherwise the picking person needs to push the processed storage containers 18 manually onto the push-away line 90 towards one of the discharging channels 32. The order containers 20 are transported beneath the push-away line 90 on the order-container conveying system 84, which is preferably formed by a (star) conveyor formed by segments.

Figure 3C:
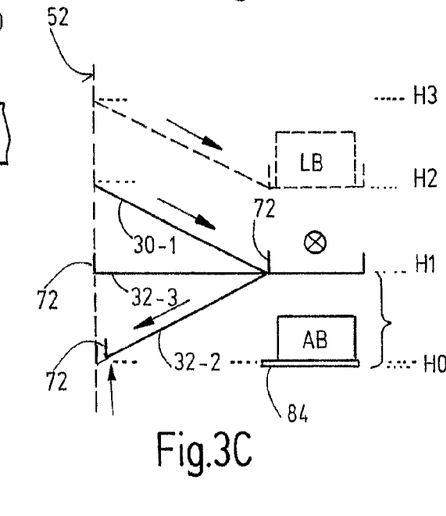
FIG. 3C shows a sectional view along the line 3C-3C in FIG. 3A.

The side view of FIG. 3C shows a section along the line 3C-3C of FIG. 3A through the feeding channel 30-1 of FIG. 3A. FIG. 3C exemplarily serves for illustrating that the channels 28 can be arranged horizontally and/or inclined. The feeding channel 30-1 is oriented downwardly from the back side 52 of the rack 82 towards the front side 50 of the rack 82. The discharging channel 32-2, which is also assigned to the feeding channel 30-1, is oriented downwardly towards the back side 52.

The side views of FIGS. 3B and 3C clearly show that the supply of the rack 82 with the storage containers 18 can happen at different or identical levels of height (H0 to H3). Storage and retrieval devices 24 exist, which comprise load-handling devices 26 which in turn can supply a plurality of planes of the rack 82 with the storage containers 18 at the same time. Thus, for example, in FIG. 3B it is possible that the storage and retrieval device 24 loads the feeding channel 30-6 while the discharging channel 32-3 is unloaded.

The present invention can be operated on principle by any conveyor type (such as roller conveyors, belt conveyors, chain conveyors, etc.). The terms "conveyor" and "conveying system" are to be understood equivalently. A conveying system includes substantially all technical and organizational devices for moving or transporting the conveying goods. In particular, the conveying system is used in the field of intralogistics.

The term "article" is to be understood particularly as a piece good. One article represents a (smallest) unit of an assortment of articles and can be distinguished by the article type. Piece goods are individualized distinguishable goods which can be handled separately and an inventory of which is controlled in pieces or bundles (colli/case). The bundle is a general term for a handable unit which can be moved manually or by means of technical devices (conveying system). Also a sub quantity of a load unit such as a beverage case on a pallet being completely loaded by beverage cases is called a bundle. The terms "article", "bundle", and "piece good", herein are used equivalently. If one of the articles is transported via the conveying system, one also speaks of a conveying good.

A "picking order" is typically represented by a data record which can be processed. The picking order can comprise a header field, a priority field, and/or an article field. The header field can comprise, amongst other things, information with regard to the customer who has provided an order, a (customer's) address, or a customer-identification number as well as an order number. The priority field includes information on whether a regular order or a priority order is present. A priority order is an order having high (processing) priority which is handled typically prior to regular orders.

The term "storage and retrieval device" represents a conveying device, or servicing device, which typically travels in a rack aisle between two racks, most times in a rail-guided manner. Storage and retrieval devices typically comprise a carriage, one or more masts, a hoisting device, as well as at least one load-handling device. For pallets, for example, the load handling happens by means of a telescopic fork, and for containers, for example, by means of pulling devices (such as hooks, lassos, or pivotal arms) or by means of belt conveyors.

A "rack arrangement" (such as a rack warehouse) typically comprises a plurality of racks being provided by individual racks or double racks. Doubles racks are individual racks being positioned back to back. Rack aisles are defined between the racks, which rack aisles typically extend in a longitudinal direction of the racks and serve as operational space of the storage and retrieval devices. The racks end at their respective opposite (short) front faces, which in turn are oriented in a plane perpendicular to the longitudinal direction of the rack aisle. The racks comprise a plurality or (rack) storage locations, or delivery locations, which are used as channels with the present invention. A rack column extends in a vertical direction within one of the racks, and typically comprises as many storage and delivery locations on top of each other as rack planes are provided.

A "vehicle", or "shuttle" is to be understood as a storage and retrieval device which substantially serves one (single) rack plane for supplying the channels of this rack plane by storage units, i.e. for storing and retrieving the storage containers 18.

In the above description of the invention identical parts and features have assigned the identical reference numerals, wherein the disclosure contained within the entire description can be roughly transferred to similar parts and features having similar reference numerals. Position information such as "above", "beneath", "lateral", etc. refer to the immediately described figure and are to be transferred roughly to the new position in case of a positional change.

Further, it is to be considered that directional information and orientations have been considered which rely on principle on the terms typically used in the field of (intra) logistics. As a result, the longitudinal direction (conveying direction) is designated by "X", the depth (width) is designated by "Z", and the (vertical) height is designated by "Y". For example, FIGS. 1 and 2 show a (Cartesian) coordinate system XYZ which corresponds thereto.

I claim:

1. An order-picking station for manual picking of articles from storage containers for said articles into at least one order container in accordance with a picking order, which picking order includes a plurality of different article types, comprising:

a rack having a first longitudinal side and a second longitudinal side arranged oppositely to the first longitudinal rack side;

a plurality of channels comprising a plurality of channels and at least one discharging channel, wherein each of the feeding channels comprises a transfer end and a provision end;

a supply device arranged for transporting the storage containers when containing said articles from a warehouse to the transfer ends of the feeding channels, and for transferring the storage containers after articles have been removed therefrom to the transfer ends, wherein each of the transfer ends is arranged and configured such that the storage containers are transferable in an automated manner by the supply device;

a material-flow control device, wherein the material-flow control device is configured to control a material flow of the storage containers within the channels exclusively unidirectionally, wherein the storage containers in the feeding channels are moved oppositely to the storage containers in the discharging channels;

an order-picking region in which a picking person manually picks the articles from the storage containers at the provision ends of respective feeding channels and manually puts the articles into the at least one order container; and a transfer region in which the storage containers are transferred between the supply device and the channels, and vice versa;

wherein each of the discharging channels comprises a receipt end and a delivery end, wherein each of the delivery ends is arranged and configured to receive the storage containers by the supply device in an automated manner;

wherein the plurality of channels are arranged in the rack and extend in a transverse direction substantially in parallel to each other between the first and second longitudinal sides of the rack;

wherein the order-picking region is arranged along the first longitudinal rack side;

wherein the transfer region is arranged along the second longitudinal rack side;

wherein each of the plurality of feeding channels has assigned at least one of the discharging channels in terms of the material flow;

wherein the provision ends and the delivery ends of the channels, which are assigned to each other, in a longitudinal direction are either spatially arranged directly adjacent, or are connected, to each other via at least one push-away location such that the storage containers can be pushed, or conveyed, in the longitudinal direction without lifting by the picking person, from the provision ends to the receipt end of the respectively assigned at least one discharging channel; and wherein the order-picking region includes an order container support for the at least one order container spaced apart from the at least one push-away location, for supporting the at least one order container while articles are removed from the storage containers and placed in the at least one order container.

2. The order-picking system of claim 1, wherein each of the feeding channels comprises a length suitable for receiving at least two of the storage containers one behind the other.

3. The order-picking station of claim 1, wherein the supply device is one of a conveyor system, a shuttle, and a storage and retrieval device.

4. The order-picking station of claim 1, wherein said one push-away location is arranged oppositely to one of the provision ends, or the receipt ends.

5. The order-picking station of claim 4, wherein the at least one push-away location includes a plurality of push-away locations forming a push-away line.

6. The order-picking station of claim 4, wherein a stopping device is provided at each of the provision ends, respectively.

7. The order-picking station of claim 4, wherein the push-away locations are driven conveying elements.

8. The order-picking station of claim 4, wherein the push-away locations respectively comprise a belt lifter which is configured to be lifted or lowered and to convey the storage containers in a longitudinal direction of the oppositely arranged channel.

9. The order-picking station of claim 1, wherein the feeding channels are one of driven flow channels and non-driven flow channels.

10. The order-picking station of claim 1, wherein the discharging channels are one of driven flow channels and non-driven flow channels.

11. The order-picking station of claim 1, wherein the order container support includes an order-container conveying system running through the order-picking region.

12. The order-picking system of claim 11, wherein the order-container conveying system is formed of accumulation-conveyor elements.

13. The order-picking station of claim 1, wherein the material-flow control device is configured to transport the order containers in the channels, which are assigned to each other, towards the picking person and away from the picking person.

14. The order-picking station of claim 1, wherein the material-flow control device is configured to use the channels with both the storage containers and the order containers.

15. An order-picking system comprising:
an order-picking station for manual picking of articles from storage containers into at least one order container in accordance with a picking order, which picking order includes a plurality of different article types, the order-picking station comprising:
a rack having a first longitudinal side and a second longitudinal side being arranged oppositely to the first longitudinal rack side;
a plurality of channels comprising a plurality of feeding channels and at least one discharging channel, wherein each of the feeding channels comprises a transfer end and a provision end;
a supply device arranged for transporting the storage containers from a warehouse to the transfer ends of the feeding channels and for transferring the storage containers to the transfer ends, wherein each of the transfer ends is arranged and configured such that the storage containers are transferable in an automated manner by the supply device;
a material-flow control device, wherein the material-flow control device is configured to control a material flow of the storage containers within the channels exclusively unidirectionally, wherein the storage containers in the feeding channels are moved oppositely to the storage containers in the discharging channels;
an order-picking region in which a picking person manually picks the articles from the storage container and manually puts the articles into the at least one order container; and
a transfer region in which the storage containers are transferred between the supply device and the channels, and vice versa;
wherein each of the discharging channels comprises a receipt end and a delivery end, wherein each of the delivery ends is arranged and configured to receive the storage containers by the supply device in an automated manner;
wherein the plurality of channels are arranged in the rack and extend substantially in parallel to each other;
wherein the order-picking region is arranged along the first longitudinal rack side at the provision ends of respective feeding channels, and the transfer region is arranged along the second longitudinal rack side;
wherein each of the feeding channels has assigned at least one of the discharging channels in terms of the material flow; and
wherein the provision ends and the delivery ends of the channels, which are assigned to each other, are either spatially arranged directly adjacent, or are connected, to each other via at least one push-away location so that the storage containers can be pushed, or conveyed, without lifting by the picking person, from the provision ends to the receipt end of the respectively assigned at least one discharging channel.

16. The order-picking system of claim 15, further comprising a storage-container warehouse coupled to the channels via the supply device.

17. A method for the manual picking of at least one article from storage containers in accordance with a picking order into an order container at an order-picking station which includes a plurality of channels comprising a plurality of feeding channels and at least one discharging channel, wherein each of the feeding channels has assigned at least one of the discharging channels in terms of the material flow, wherein the channels are arranged in a rack and extend in a transverse direction substantially in parallel to each other between first and second longitudinal sides of the rack, and wherein an order-picking region is arranged along the first longitudinal rack side and a transfer region is arranged along the second longitudinal rack side, the method comprising the steps of:
feeding the storage containers in a preset sequence to provision ends of the feeding channels;
removing the at least one article from at least one of the storage containers at the provision end of a respective feeding channel;
delivering the at least one article to the order container;
pushing, or transporting, the storage container at the provision end of the respective feeding channel, from which the at least one article has been removed, in a longitudinal direction from the feeding channel to the discharging channel;
discharging the storage container, from which the at least one article has been removed, via the assigned discharging channel;
wherein the feeding channel and the assigned discharging channel are operated oppositely in a respectively unidirectional manner.

18. The order-picking station of claim 4, wherein the push-away locations are non-driven conveying elements.

* * * * *